United States Patent
Liang et al.

(10) Patent No.: US 11,680,818 B2
(45) Date of Patent: Jun. 20, 2023

(54) SYSTEM AND METHOD FOR UPDATING AND SHARING CROSSROAD DYNAMIC MAP DATA

(71) Applicant: AUTOMOTIVE RESEARCH & TESTING CENTER, Changhua Hsien (TW)

(72) Inventors: Chih-Neng Liang, Changhua Hsien (TW); You-Sian Lin, Changhua Hsien (TW)

(73) Assignee: Automotive Research & Testing Center, Changhwa Hsien (TW)

( * ) Notice: Subject to any disclaimer, the term of this patent is extended or adjusted under 35 U.S.C. 154(b) by 384 days.

(21) Appl. No.: 16/986,376

(22) Filed: Aug. 6, 2020

(65) Prior Publication Data
US 2022/0042820 A1 Feb. 10, 2022

(51) Int. Cl.
*G01C 21/00* (2006.01)
*H04W 4/02* (2018.01)
*H04L 67/10* (2022.01)

(52) U.S. Cl.
CPC ..... *G01C 21/3841* (2020.08); *G01C 21/3815* (2020.08); *G01C 21/3885* (2020.08); *H04W 4/023* (2013.01); *H04L 67/10* (2013.01)

(58) Field of Classification Search
CPC ............ G01C 21/3841; G01C 21/3815; G01C 21/3885; G01C 21/3848; H04W 4/023; H04W 4/40; H04L 67/10
See application file for complete search history.

(56) References Cited

U.S. PATENT DOCUMENTS

2014/0145861 A1* 5/2014 Goudy ................... G08G 1/163
340/905
2021/0365712 A1* 11/2021 Lu .......................... G01C 21/30

FOREIGN PATENT DOCUMENTS

CN 105427669 A * 3/2016
CN 110419070 A * 11/2019 ............. B60R 21/00

* cited by examiner

*Primary Examiner* — Nga X Nguyen
(74) *Attorney, Agent, or Firm* — Rosenberg, Klein & Lee

(57) ABSTRACT

A system and a method for updating and sharing crossroad dynamic map data are disclosed. The method includes steps of receiving a detection information outputted from an on-vehicle detecting device, wherein the detection information includes a host-vehicle absolute coordinate, a host-vehicle course, a host-vehicle speed, a relative speed between an object and the host vehicle, and an initial relative coordinate between the object and the host vehicle; respectively performing matching procedures to the host-vehicle absolute coordinate and the initial relative coordinate by respectively adding estimated coordinate shifts to obtain a matched host-vehicle absolute coordinate and a matched relative coordinate; performing a coordinate rotation transformation to the matched relative coordinate to obtain a matched transformed coordinate; merging the matched host-vehicle absolute coordinate and the matched transformed coordinate into crossroad-section map data to form crossroad dynamic map data; and sharing the crossroad dynamic map data.

14 Claims, 9 Drawing Sheets

SYSTEM AND METHOD FOR UPDATING AND SHARING CROSSROAD DYNAMIC MAP DATA

BACKGROUND OF THE INVENTION

1. Field of the Invention

The present invention relates generally to a system and a method for updating and sharing map data, and more particularly to a system and a method for updating and sharing crossroad dynamic map data.

2. Description of Related Art

With the development of Intelligent Transport System (ITS), the self-driving vehicle (such as the self-driving car) will be one of the mainstream transportation tools. Attributed to the navigation decisions determined by a computer, the self-driving car can navigate on the roadway. For example, the self-driving car may be equipped with detecting units including cameras, light detection and ranging (LiDAR) systems, global navigation satellite systems (GNSS), inertial navigation systems (INS), and so on to locate the position of the self-driving car and detect the objects (such as other cars or pedestrians) around the self-driving car. Hence, the self-driving car may make the navigation decisions based on the data from the detecting units.

In comparison with the controllable roadway situation at the laboratory or the test field, there are various cars and pedestrians, even the cars and pedestrians that violate the traffic rules (such as speeding, running the red light, and so on), going through the actual roadway. Especially, the cars and the pedestrians pass through the crossroad (such as a road junction or intersection) from different directions. As a result, it is important for a self-driving car to smoothly and safely pass through the crossroad.

However, the conventional self-driving car has a limited detecting coverage. The detecting coverage is limited to the region nearby the self-driving car, but other cars and the pedestrians pass through the crossroad from different directions. Hence, the conventional self-driving car fails to detect some crossroad situations, especially the crossroad situations distal from the self-driving car and beyond the detecting coverage. As a result, when the self-driving car navigates through the crossroad, the self-driving car cannot effectively monitor all the crossroad situations and cannot execute more comprehensive navigation decisions.

SUMMARY OF THE INVENTION

An objective of the present invention is to provide a system and a method for updating and sharing crossroad dynamic map data to overcome the drawback induced from the limited detecting coverage of the conventional self-driving car.

The system for updating and sharing crossroad dynamic map data comprises an on-vehicle detecting device and a computing device. The on-vehicle detecting device is mounted on a host vehicle to detect at least one object around the host vehicle and periodically outputs a detection information including a host-vehicle absolute coordinate, a host-vehicle course, a host-vehicle speed, a relative speed between the at least one object and the host vehicle, and an initial relative coordinate between the at least one object and the host vehicle. The computing device stores crossroad-section map data established in a geodesic coordinate system comprising a reference direction.

When the computing device receives the detection information from the on-vehicle detecting device, the computing device adds an estimated host-vehicle coordinate shift to the host-vehicle absolute coordinate to obtain a matched host-vehicle absolute coordinate, and adds an estimated object coordinate shift to the initial relative coordinate between the at least one object and the host vehicle to obtain a matched relative coordinate. The estimated host-vehicle coordinate shift is computed based on the host-vehicle speed and a time difference, and the estimated object coordinate shift is computed based on the relative speed between the at least one object and the host vehicle and the time difference. The computing device converts the matched relative coordinate into a matched transformed coordinate by performing a coordinate rotation transformation according to the host-vehicle course and the reference direction, merges the matched host-vehicle absolute coordinate and the matched transformed coordinate into the crossroad-section map data to form crossroad dynamic map data, and then shares the crossroad dynamic map data.

The method for updating and sharing a crossroad dynamic map data is performed by a computing device. The computing device receives a detection information outputted from at least one on-vehicle detecting device, wherein the detection information includes a host-vehicle absolute coordinate, a host-vehicle course, a host-vehicle speed, a relative speed between the at least one object and the host vehicle, and an initial relative coordinate between the at least one object and the host vehicle. The computing device adds an estimated host-vehicle coordinate shift to the host-vehicle absolute coordinate to obtain a matched host-vehicle absolute coordinate, and adds an estimated object coordinate shift to the initial relative coordinate between the at least one object and the host vehicle to obtain a matched relative coordinate; wherein the estimated host-vehicle coordinate shift is computed based on the host-vehicle speed and a time difference, and the estimated object coordinate shift is computed based on the relative speed between the at least one object and the host vehicle and the time difference. The computing device converts the matched relative coordinate into a matched transformed coordinate by performing a coordinate rotation transformation according to the host-vehicle course and a reference direction of a geodesic coordinate system. The computing device merges the matched host-vehicle absolute coordinate and the matched transformed coordinate into crossroad-section map data to form crossroad dynamic map data. The computing device shares the crossroad dynamic map data.

In conclusion, the crossroad dynamic map data shared by the present invention may provide the position information of the object passing through the crossroad. For example, when ten self-driving vehicles equipped with the on-vehicle detecting devices of the present invention navigate through the crossroad from different directions, the detection information respectively corresponding to the ten self-driving vehicles would be provided to the computing device for generating and share the crossroad dynamic map data. Therefore, the self-driving vehicle navigating through the crossroad may receive the crossroad dynamic map data and obtain the whole crossroad situation (including the detection information from the rest of the self-driving vehicles) beyond its detecting coverage. Especially, the position of the object in the crossroad dynamic map data is a predicted position to be more consistent with an actual traffic situation at the crossroad, rather than an earlier traffic situation. The self-driving vehicle may execute comprehensive navigation decisions based on the crossroad dynamic map data to improve the driving safety and overcome the aforementioned drawback.

DETAILED DESCRIPTION OF PREFERRED EMBODIMENT(S)

Figure 1:
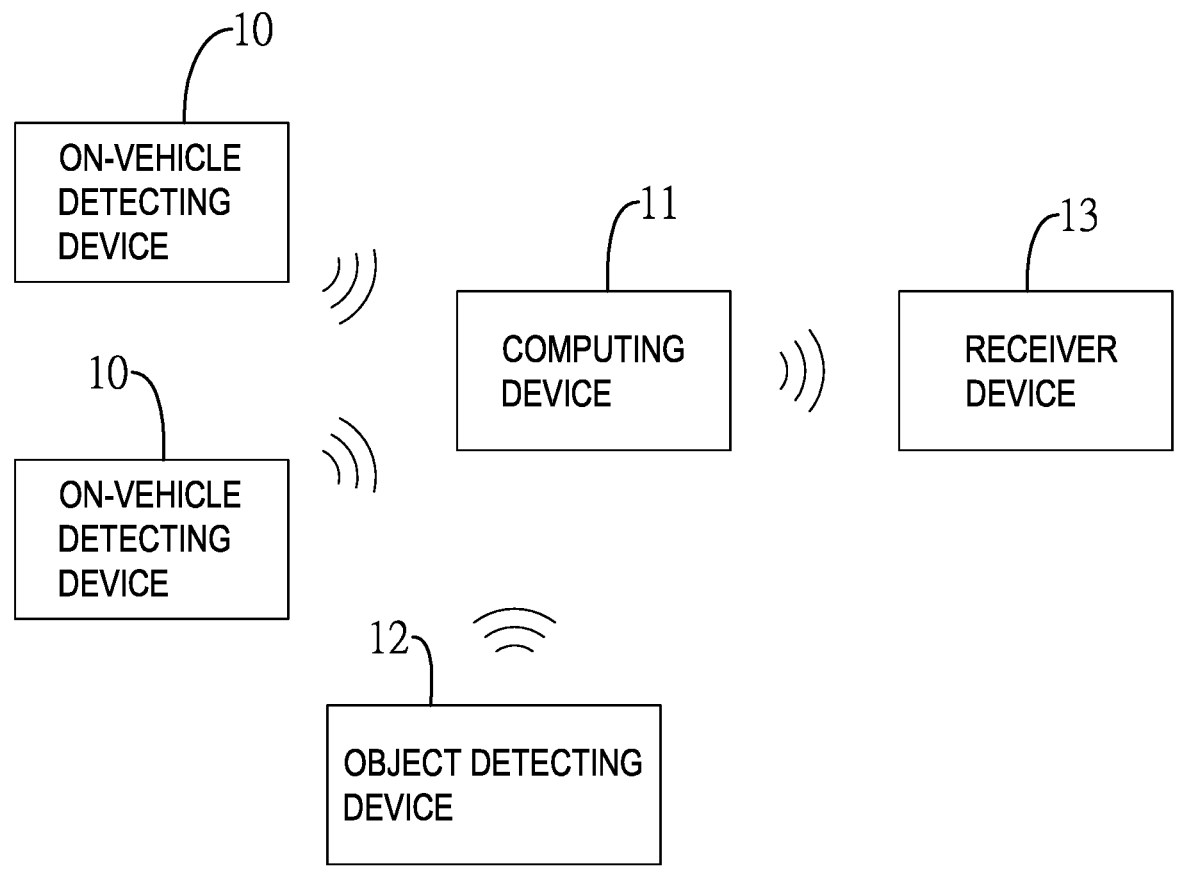
FIG. 1 is a block diagram of the system for updating and sharing crossroad dynamic map data of the present invention.

With reference to FIG. 1, an embodiment of the system for updating and sharing crossroad dynamic map data of the present invention comprises at least one on-vehicle detecting device 10 and at least one computing device 11, or further comprises at least one object detecting device 12. The on-vehicle detecting device 10 is provided to be mounted on a vehicle (hereinafter referred to as a host vehicle). The object detecting device 12 is provided to be installed on a roadside. On the whole, the present invention utilizes the on-vehicle detecting device 10 or further in combination with the object detecting device 12 to detect the location of at least one object around the host vehicle or at the crossroad, and periodically transmits the detecting result to the computing device 11. Said object is a detectable thing, such as vehicles (cars), pedestrians, or other things (such as articles scattered on the road). The computing device 11 performs a match process to the detecting result and merge it into crossroad-section map data to form crossroad dynamic map data. The computing device 11 may periodically broadcast the crossroad dynamic map data to share the crossroad dynamic map data to a receiver device 13. For example, the receiver device 13 may be a self-driving car, an on-vehicle AV (audio and video) navigation device, a user device (such as a smart phone), etc. Hence, the receiver device 13 may receive and make use of the crossroad dynamic map data. The detail of the present invention is described below.

Figure 2:
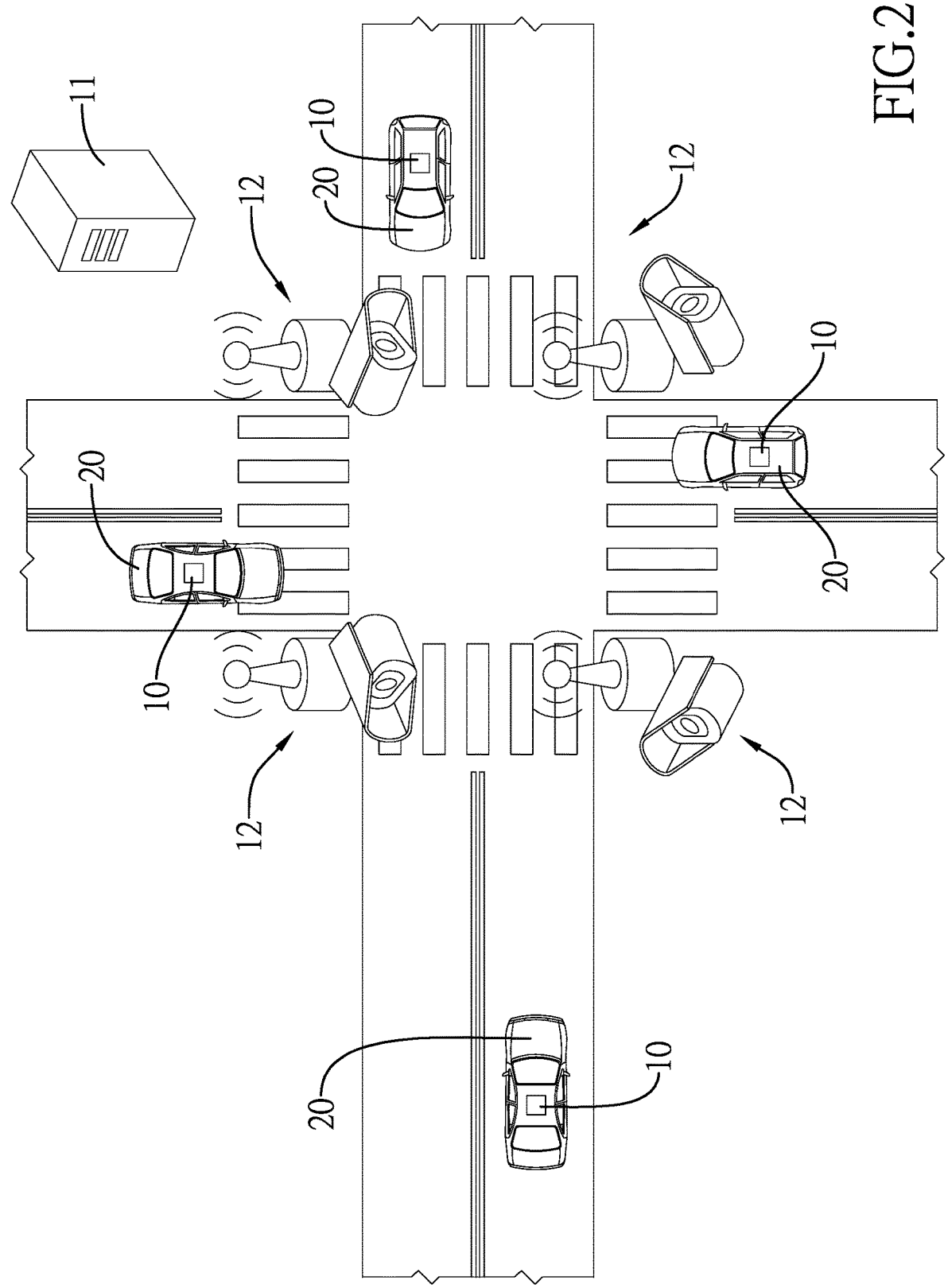
FIG. 2 is a schematic diagram of a usage scenario of the system of the present invention.
Figure 3:
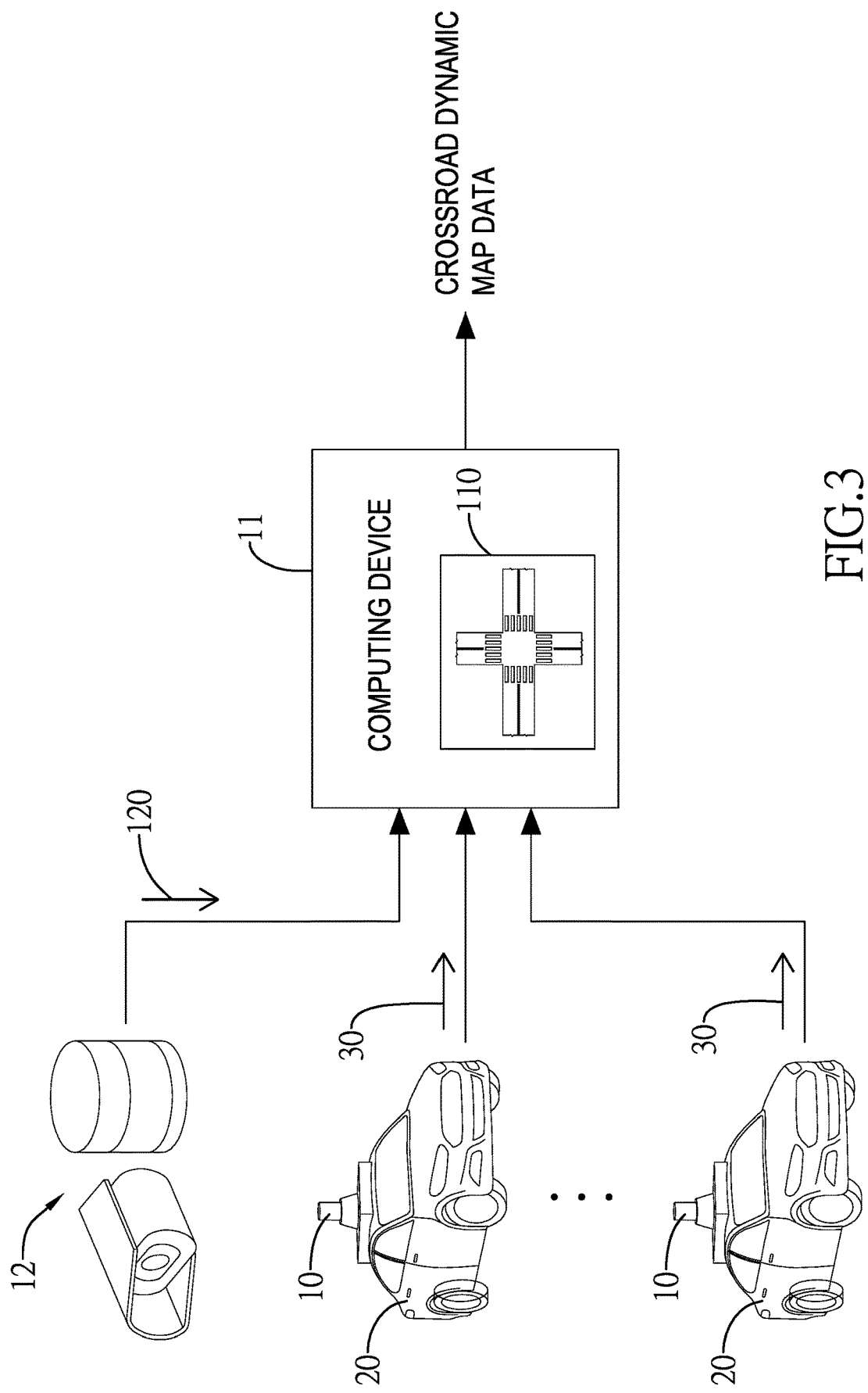
FIG. 3 is a schematic diagram for generating the crossroad dynamic map data by the computing device according to the detection information in the present invention.
Figure 4:
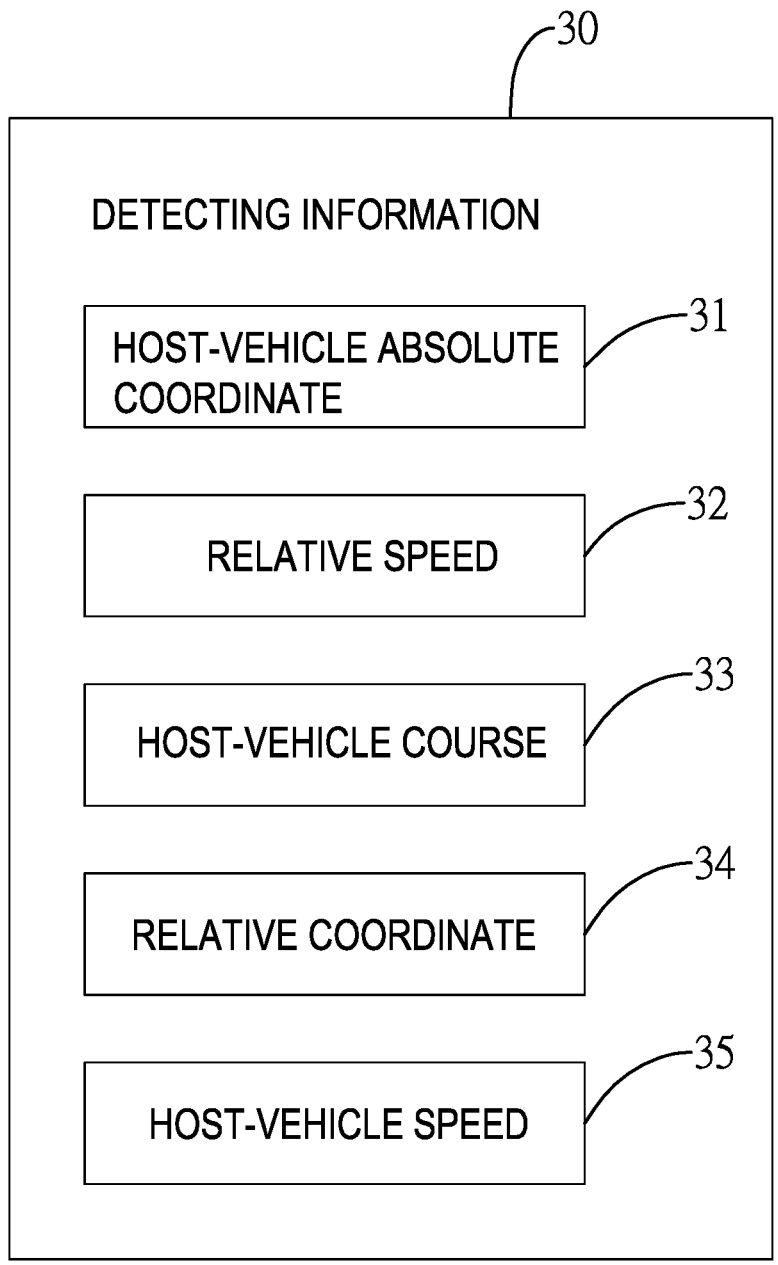
FIG. 4 is a block diagram of the detection information in the present invention.

In the embodiment of the present invention, with reference to FIGS. 2 and 3, each on-vehicle detecting device 10 may be mounted on the host vehicle 20 navigating on a road. The host vehicle 20 may be a self-driving car or a non-self-driving car. The on-vehicle detecting device 10 may comprise a camera, a light detection and ranging (LiDAR) system, a global navigation satellite system (GNSS), an inertial navigation system (INS), and a wireless communication module for transmitting data. The functions of position locating, sensing, and data transmitting are common knowledge in the art and would not be detailedly described herein. The on-vehicle detecting device 10 may periodically output a detection information 30. For example, the means to output the detection information 30 may be (but not limited to be) via dedicated short range communication (DSRC) or mobile telecommunication (such as the $5^{th}$ generation (5G) or higher than the 5G mobile telecommunication technology). With reference to FIG. 4, the detection information 30 may comprise a host-vehicle absolute coordinate 31 of the host vehicle 20 generated by the function of position locating and at least one relative speed 32 between at least one object and the host vehicle 20, a host-vehicle course 33, a relative coordinate 34 between the at least one object and the host vehicle 20, and a host-vehicle speed 35, wherein the host-vehicle course 33 indicates a navigating course of the host vehicle 20. In the embodiment of the present invention, the at least one object detected by the on-vehicle detecting device 10 is one object as an example. The relative coordinate 34 in the detection information 30 is also defined as an initial relative coordinate in the following paragraphs.

With reference to FIG. 4, the host-vehicle absolute coordinate 31 may indicate an absolute position of the host vehicle 20 located in the crossroad-section map data. The relative coordinate 34 may indicate a relative position between the object and the host vehicle 20. For conciseness in description, the host-vehicle absolute coordinate 31 and the relative coordinate 34 may be represented as coordinate values defined in an X-Y plane coordinate system, which would be converted to and from longitude and latitude of a geodetic coordinates system.

A first embodiment of the computing device 11 may be an Edge computing device installed on a roadside and comprise a wireless communication module and a processor to receive broadcast information, process information, and broadcast information. For example, the computing device 11 may broadcast or receive information via, but not limited to, DSRC. Hence, when the host vehicle 20 goes through the crossroad, the on-vehicle detecting device 10 on the host vehicle 20 may broadcast its detection information 30. The computing device 11 then may receive the detection information 30. In addition, a second embodiment of the computing device 11 may be a cloud server. The on-vehicle detecting device 10 may communicate with the computing device 11 via the mobile telecommunication technology, such that the on-vehicle detecting device 10 may transmit the detection information 30 to the computing device 11 via the mobile telecommunication technology.

With reference to FIG. 3, the computing device 11 stores the crossroad-section map data 110. The crossroad-section map data 110 may be a high-resolution crossroad plane graphic including information of lanes indications (such as lane lines, zebra crossing, etc.). The crossroad-section map data 110 may be established in a geodesic coordinate system comprising a reference direction. For example, a section range of the crossroad-section map data 110 may be divided by the longitude and latitude of the geodetic coordinate system. The reference direction may comprise East, West, South, and North.

Figure 9:
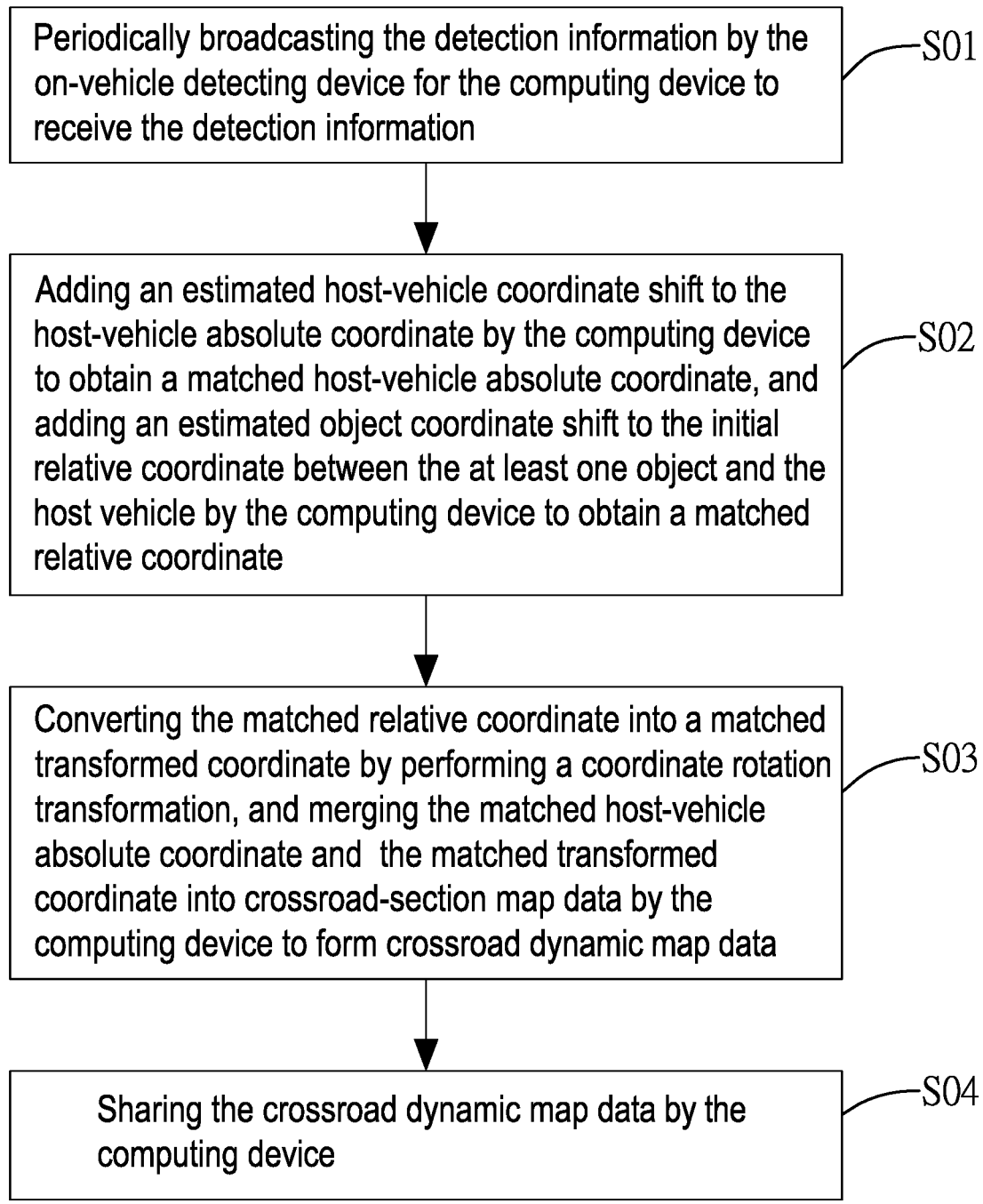
FIG. 9 is a flow chart of the method for updating and sharing crossroad dynamic map data of the present invention.

The method for updating and sharing crossroad dynamic map data of the present invention will be specified in the following instance. The method of the present invention is performed by the computing device 11. With reference to FIGS. 2, 3 and 9, the computing device 11 is the Edge computing device as an example. When the host vehicle 20 goes through the crossroad, as mentioned above, the on-vehicle detecting device 10 on the host vehicle 20 periodically broadcasts the detection information 30 for the computing device 11 to receive the detection information 30 (STEP S01). Each time when the computing device 11 receives the detection information 30, the computing device 11 adds an estimated host-vehicle coordinate shift (described as follows) to the host-vehicle absolute coordinate 31 in the detection information 30 to obtain a matched host-vehicle absolute coordinate, and adds an estimated object coordinate shift (described as follows) to the initial relative coordinate (the relative coordinate 34) between the at least one object and the host vehicle 20 to obtain a matched relative coordinate (STEP S02). Because the matched relative coordinate only indicates a relative position between the object and the host vehicle 20, the computing device 11 performs a coordinate rotation transformation to the matched relative coordinate according to the host-vehicle course 33 and the reference direction in order to locate the relative position between the object and the host vehicle 20 on the X-Y plane coordinate system. Afterwards, the computing device 11 converts the matched host-vehicle absolute coordinate of the host vehicle 20 and the matched relative coordinate computed by the coordinate rotation transformation into longitude and latitude and then merges them into the crossroad-section map data 110 to form crossroad dynamic map data (STEP S03) and then share the crossroad dynamic map data (STEP S04). The means to share the crossroad dynamic map data may be DSRC as an example.

Figure 5:
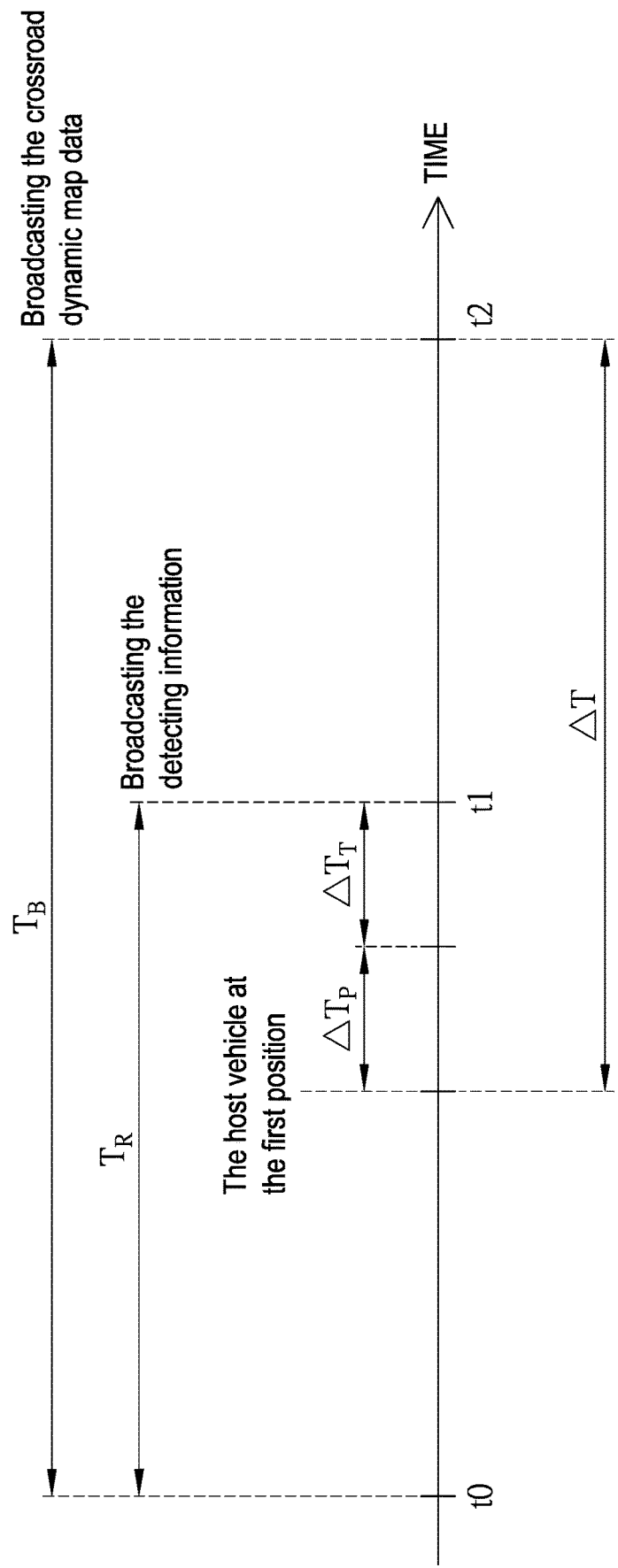
FIG. 5 is a schematic time chart for broadcasting the crossroad dynamic map data in the present invention.

Regarding the generation of the estimated host-vehicle coordinate shift and the estimated object coordinate shift in the STEP S02, with reference to FIG. 5 and further to FIGS. 2, 3 and 4, when the host vehicle 20 is in a first position, the on-vehicle detecting device 10 of the host vehicle 20 may generally spend $\Delta T_P$ of time computing information and spend $\Delta T_T$ of time transmitting information. The on-vehicle detecting device 10 may broadcast the detection information 30 at a first time point $t_1$. The detection information 30 is a detection result generated by the on-vehicle detecting device 10 at the first position. The broadcast period of the on-vehicle detecting device 10 may be $T_B$. As mentioned above, $\Delta T_P, \Delta T_T$, and $T_B$ are known information to be preset in the computing device 11. For example, $\Delta T_P$ and $\Delta T_T$ may be 5 (ms), $T_R$ may be 125 (ms), and $T_B$ may be 200 (ms).

As mentioned above, the computing device 11 may broadcast at a second time point t2. A time difference $\Delta T$ is for information computing and transmitting between a time point that the host vehicle 20 is located in the first position and at the second time point t2. As the time length indicated above, the time difference $\Delta T$ may be 85 (ms). The position of the host vehicle 20 and the relative position between the object and the host vehicle 20 may vary with time. The estimated host-vehicle coordinate shift and the estimated object coordinate shift are respectively estimated to predict the variations of the detection information 30 within the time difference $\Delta T$. Therefore, the crossroad dynamic map data broadcasted by the computing device 11 at the second time point t2 may be more consistent with an actual traffic situation at the crossroad, rather than an earlier traffic situation.

The estimated object coordinate shift may be represented as:

$$\begin{bmatrix} X_{object\_shift} \\ Y_{object\_shift} \end{bmatrix} = \begin{bmatrix} V_{X\_relative} \\ V_{Y\_relative} \end{bmatrix} * \Delta T$$

wherein X and Y are coordinate axes in the X-Y plane coordinate system, $$\begin{bmatrix} X_{object\_shift} \\ Y_{object\_shift} \end{bmatrix}$$

is the estimated object coordinate shift;

$$\begin{bmatrix} V_{X\_relative} \\ V_{Y\_relative} \end{bmatrix}$$

is the relative speed 32 between the object and the host vehicle 20, and $\Delta T$ is the time difference. Hence, the matched relative coordinate may be represented as:

$$\begin{bmatrix} X_{object\_match} \\ Y_{object\_match} \end{bmatrix} = \begin{bmatrix} X_{object\_shift} \\ Y_{object\_shift} \end{bmatrix} + \begin{bmatrix} X_{relative} \\ Y_{relative} \end{bmatrix} \text{ wherein } \begin{bmatrix} X_{object\_match} \\ Y_{object\_match} \end{bmatrix}$$

is the matched relative coordinate, and $$\begin{bmatrix} X_{relative} \\ Y_{relative} \end{bmatrix}$$

is the initial relative coordinate (such as the relative coordinate 34 between the object and the host vehicle 20)

On the other hand, the estimated host-vehicle coordinate shift may be represented as:

$$\begin{bmatrix} X_{local\_shift} \\ Y_{local\_shift} \end{bmatrix} = \begin{bmatrix} V_{X\_local} \\ V_{Y\_local} \end{bmatrix} * \Delta T$$

wherein X and Y are coordinate axes in the X-Y plane coordinate system, $$\begin{bmatrix} X_{local\_shift} \\ Y_{local\_shift} \end{bmatrix}$$

is the estimated host-vehicle coordinate shift, $$\begin{bmatrix} V_{X\_local} \\ V_{Y\_local} \end{bmatrix}$$

is the host-vehicle speed 35 of the host vehicle 20, and $\Delta T$ is the time difference. Hence, the matched host-vehicle absolute coordinate may be represented as:

$$\begin{bmatrix} X_{local\_match} \\ Y_{local\_match} \end{bmatrix} = \begin{bmatrix} X_{local\_shift} \\ Y_{local\_shift} \end{bmatrix} + \begin{bmatrix} X_{local} \\ Y_{local} \end{bmatrix}$$

wherein $\begin{bmatrix} X_{local\_match} \\ Y_{local\_match} \end{bmatrix}$ is the matched host-vehicle absolute coordinate of the host vehicle 20, and $$\begin{bmatrix} X_{local} \\ Y_{local} \end{bmatrix}$$

is the host-vehicle absolute coordinate 31 of the host vehicle 20.

The following disclosure with figures would specify the usage situation of the present invention. With reference to the crossroad in FIG. 6 and further to FIGS. 2, 3 and 4, there are four self-driving cars, including a first, a second, a fourth, and a fifth self-driving car 41, 42, 44, 45, and a motorcycle 50 navigating along the east-west roadway. There are two self-driving cars, including a third and a sixth self-driving car 43, 46, and a non-self-driving car 51 navigating along the south-north roadway. Each one of the self-driving cars 41-46 is equipped with the on-vehicle detecting device 10 of the present invention.

The objects detected by the on-vehicle detecting device 10 on the first self-driving car 41 may include the second self-driving car 42. As a result, in a first detection information 410 for the first self-driving car 41, the initial relative coordinate between the first self-driving car 41 and the second self-driving car 42 may indicate a situation that the second self-driving car 42 is located in front of and on the left-hand side of the first self-driving car 41. A first host-vehicle course 331 of the first self-driving car 41 is straight to the East. Similarly, the second to the sixth detection information 420-460 for the second to sixth self-driving cars 42-46 may be deduced from the first detection information 410 and the first self-driving car 41.

The detection information 410460 from the self-driving cars 4146 is transmitted to the computing device 11 respectively. The computing device 11 performs the coordinate matching and merging as mentioned above. For example (to the first detection information 410 from the first self-driving car 41), the first host-vehicle course 331 of the first self-driving car 41 is straight to the East. The matched relative coordinate only indicates that the second self-driving car 42 is located in front of and on the left-hand side of the first self-driving car 41. In order to convert the "front" in the relative position relationship into the "East" in the geodesic coordinate system, because an angle difference between the "front" and the "East" is 90 degrees, a rotation matrix may be used to perform the coordinate rotation transformation to the matched relative coordinate of the first self-driving car 41, such that the "front" in the relative position may be converted into the "East" in the geodesic coordinate system.

Figure 7:
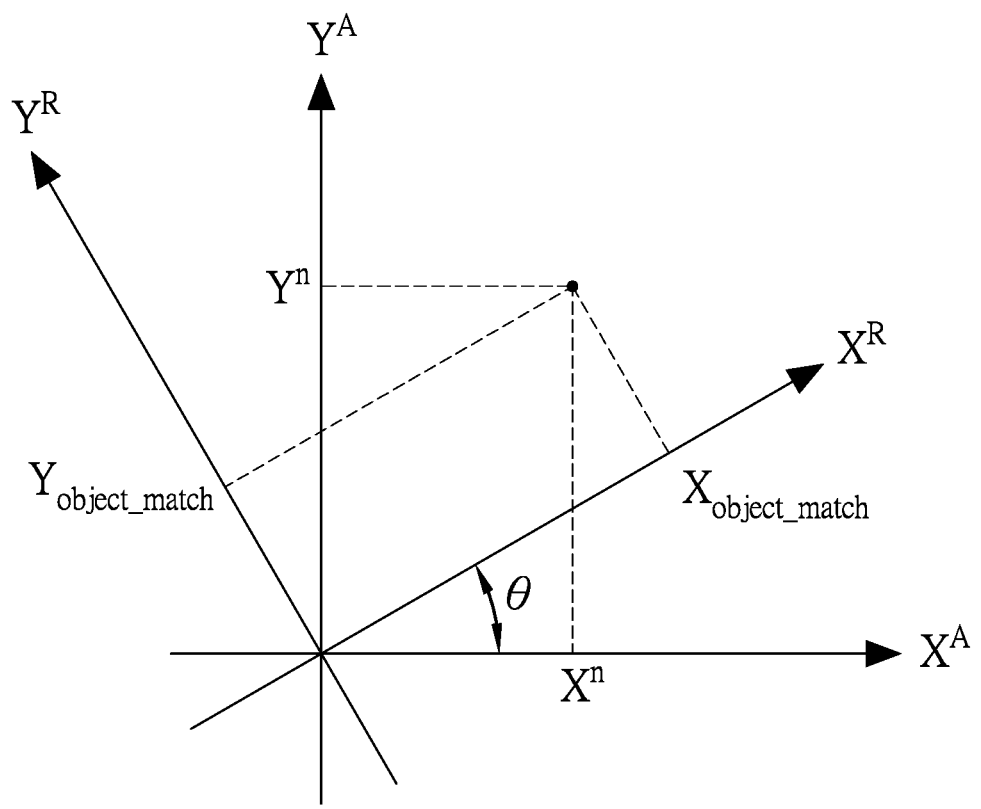
FIG. 7 is a schematic diagram of the coordinate rotation transformation in the present invention.

With reference to FIG. 7, $X^A$ and $Y^A$ are coordinate axes in the X-Y plane coordinate system. The arrowhead of $Y^A$ is straight to the North of the geodesic coordinate system. The arrowhead of $X^A$ is straight to the East of the geodesic coordinate system. $X^R$ and $Y^R$ are axes for indicating the relative position between the object and the host vehicle 20. In general, said coordinate rotation transformation may be represented as:

$$\begin{bmatrix} X^n \\ Y^n \end{bmatrix} = \begin{bmatrix} \cos(\theta^\circ) & \sin(\theta^\circ) \\ -\sin(\theta^\circ) & \cos(\theta^\circ) \end{bmatrix} \begin{bmatrix} X_{object\_match} \\ Y_{object\_match} \end{bmatrix}$$

wherein $\begin{bmatrix} X^n \\ Y^n \end{bmatrix}$ is the matched relative coordinate after rotated (hereinafter referred to as a matched transformed coordinate, to indicate the position of the object);

$$\begin{bmatrix} \cos(\theta^\circ) & \sin(\theta^\circ) \\ -\sin(\theta^\circ) & \cos(\theta^\circ) \end{bmatrix}$$

is the rotation matrix, 0° is a rotation angle of the rotation matrix, and $$\begin{bmatrix} X_{object\_match} \\ Y_{object\_match} \end{bmatrix}$$

is the matched relative coordinate.

Figure 6:
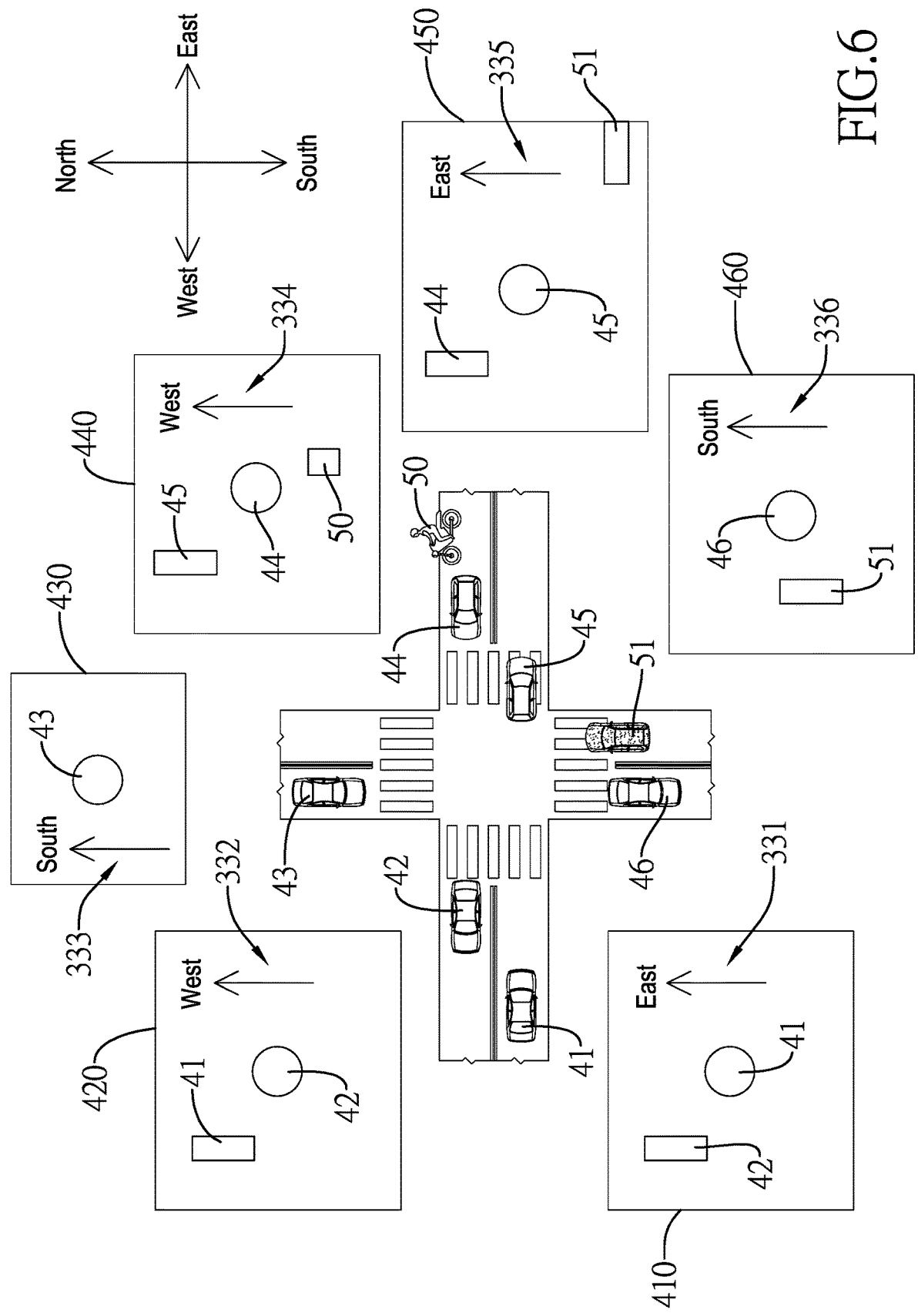
FIG. 6 is a schematic diagram of the detection information generated by multiple on-vehicle detecting devices respectively in the present invention.

With reference to the first detection information 410 as an example in FIG. 6, the matched host-vehicle absolute coordinate of the first self-driving car 41 is an origin point for the coordinate system of the first detection information 410 to be rotated 90 degrees (θ=90). The coordinate transformation for the second to sixth detection information 420460 may be deduced from the first detection information 410. The relation of the "front" of the relative position and the reference direction of the geodesic coordinate system should be noted to confirm the rotation degree of the rotation matrix.

Figure 8:
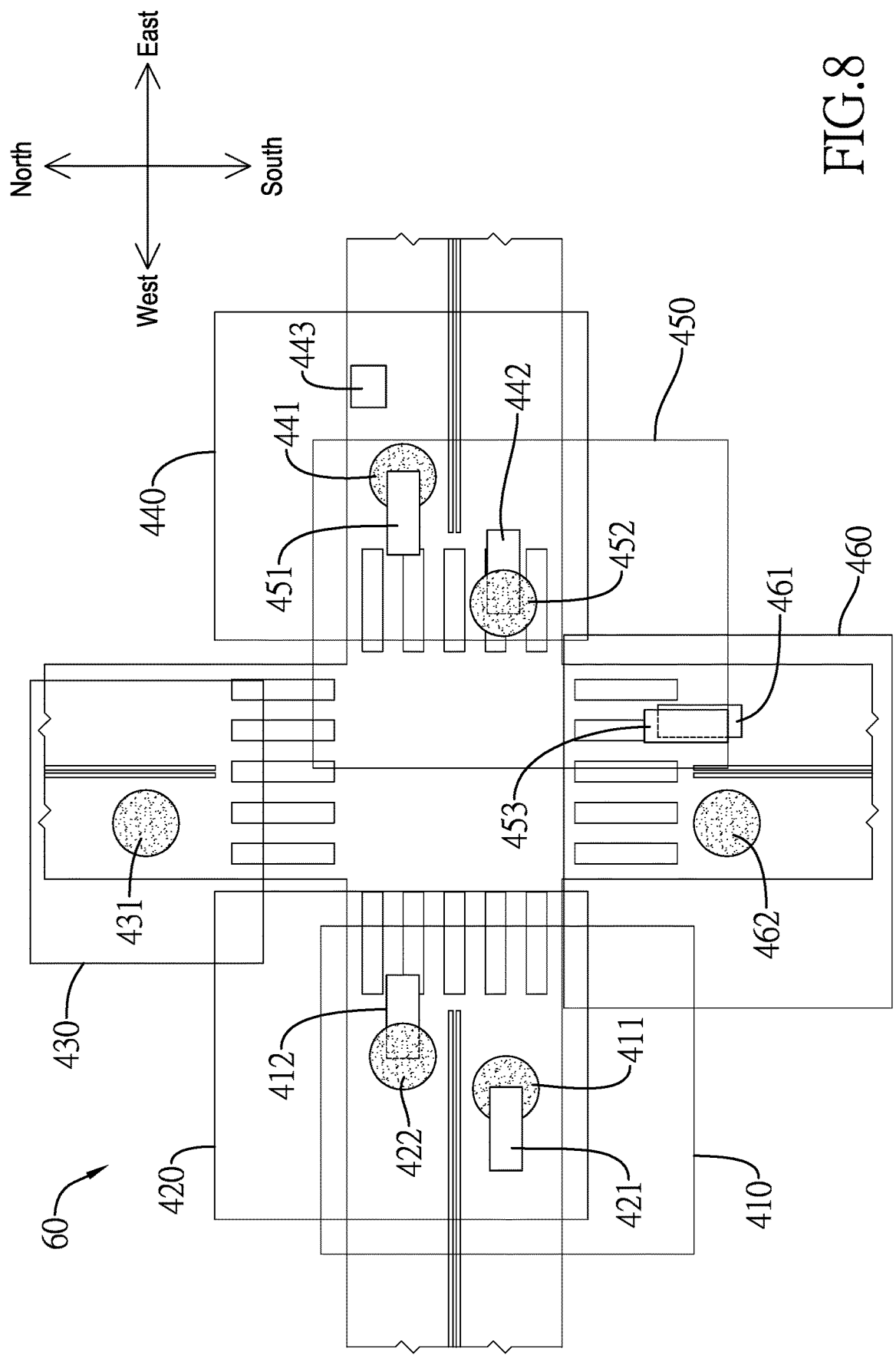
FIG. 8 is a schematic diagram of the crossroad dynamic map data in the present invention.

With reference to FIG. 8 showing the crossroad dynamic map data 60 and further to FIG. 6, the first detection information 410 and the second detection information 420 are examples for the following description. The position of a first matched host-vehicle absolute coordinate 411 of the first self-driving car 41 corresponds to the position of a first matched transformed coordinate 421 computed from the second detection information 420. Similarly, the position of a second matched host-vehicle absolute coordinate 422 of the second self-driving car 42 corresponds to the position of a second matched transformed coordinate 412 computed from the first detection information 410.

The situations of the third to sixth self-driving cars 43-46 may be deduced from the first and second self-driving cars 41, 42 as mentioned above. In brief, the position of a fourth matched host-vehicle absolute coordinate 441 of the fourth self-driving car 44 corresponds to the position of a fourth matched transformed coordinate 451 computed from the fifth detection information 450. The position of a fifth matched host-vehicle absolute coordinate 452 of the fifth self-driving car 45 corresponds to the position of a fifth matched transformed coordinate 442 computed from the fourth detection information 440. The position of the motorcycle 50 corresponds to the position of a third matched transformed coordinate 443 computed from the fourth detection information 440. The position of the non-self-driving car 51 corresponds to the position of a sixth matched transformed coordinate 453 computed from the fifth detection information 450 and the position of a seventh matched transformed coordinate 461 computed from the sixth detection information 460. A third matched host-vehicle absolute coordinate 431 of the third self-driving car 43 and a sixth matched host-vehicle absolute coordinate 462 of the six self-driving car 46 are displayed individually.

In conclusion, the crossroad dynamic map data 60 may display the position of the object passing through the crossroad. As shown in FIGS. 2, 3, 4 and 6, the first self-driving car 41 is an example in the following description. Although the third to sixth self-driving cars 43-46, the motorcycle 50, and the non-self-driving car 51 are located beyond the detecting coverage of the on-vehicle detecting device 10 of the first self-driving car 41, the on-vehicle detecting device 10 of the first self-driving car 41 may acquire the current movements of the third to sixth self-driving cars 43-46, the motorcycle 50, and the non-self-driving car 51 based on the crossroad dynamic map data 60 as shown in FIG. 8. When the computing device 11 periodically broadcasts the crossroad dynamic map data 60, the position of each object is periodically updated. Hence, the object is dynamically displayed in the crossroad dynamic map data 60.

Therefore, when a self-driving car navigates through the crossroad, the self-driving car may receive the crossroad dynamic map data 60 broadcasted from the computing device 11. The self-driving car may execute comprehensive navigation decisions. In addition, cars or user devices (such as smart phones) may also receive the crossroad dynamic map data 60 broadcasted from the computing device 11 and display the crossroad dynamic map data 60 for the drivers or the passengers to review it. The drivers may realize the instant traffic situation at the crossroad, such that driving safety at the crossroad may be improved.

Another embodiment of the present invention may further include the object detecting device 12. Compared with the on-vehicle detecting device 10, the object detecting device 12 may be fixedly mounted on a roadside in order to detect objects on the crossroad. The on-vehicle detecting device 10 and the object detecting device 12 may detect the same or different objects. In the following description, the at least one object detected by the on-vehicle detecting device 10 is defined as at least one first object. At least one object detected by the object detecting device 12 is defined as at least one second object. With reference to FIGS. 2 and 3, the object detecting device 12 may also transmit an auxiliary detection information 120 to the computing device 11 via broadcasting or mobile telecommunication technology. The auxiliary detection information 120 is similar to the detection information 30 generated by the on-vehicle detecting device 10. For example, the object detecting device 12 may also detect the vehicle (car), pedestrian, or any other thing (such as articles scattered on the road) as the at least one second object and transmit the auxiliary detection information 120 to the computing device 11. Different from the detection information 30, the auxiliary detection information 120 does not have the host-vehicle course 33 and the host-vehicle speed 35 of the detection information 30 because the position of the object detecting device 12 is fixed. The auxiliary detection information 120 includes an absolute coordinate of the object detecting device 12, a relative speed between the at least one second object and the object detecting device 12, and a relative coordinate between the at least one second object and the object detecting device 12.

Because the position of the object detecting device 12 is fixed, the absolute coordinate of the object detecting device 12 may be preset in the computing device 11. Deduced from the STEP S02 as mentioned above, the computing device 11 may compute an auxiliary coordinate shift according to the relative speed between the at least one second object and the object detecting device 12 and a time difference for information computing and transmission (the computation of the auxiliary coordinate shift is similar to the computation of the estimated object coordinate shift). Then the computing device 11 may add the auxiliary coordinate shift to the relative coordinate between the at least one second object and the object detecting device 12 to obtain an auxiliary matched coordinate. Afterwards, the computing device 11 may directly add the auxiliary matched coordinate to the absolute coordinate of the object detecting device 12 to locate a coordinate position of the at least one second object, such that the coordinate position of the at least one second object may be transformed into longitude and latitude to merge into the crossroad-section map data 60. The auxiliary matched coordinate may not be computed by the coordinate rotation transformation.

The computing device 11 of the aforementioned embodiment of the present invention is the Edge computing device. In another embodiment, the computing device 11 may be the cloud server and may provide various service functions based on the detection information 30 and the auxiliary detection information 120. For example, the computing device 11 may store each auxiliary detection information 120 transmitted from the object detecting device 12. Each auxiliary detection information 120 may include multiple coordinates of multiple second objects. Hence, the computing device 11 may determine whether one of the second objects shifts according to a change of an earlier coordinate and a later coordinate of the second object. Besides, the computing device 11 may accumulate a static time Ts of each second object. The computing device 11 may have multiple different time thresholds. For example, the multiple different time thresholds may include a first time threshold Ta, a second time threshold Tb, a third time threshold Tc, and a fourth time threshold Td, wherein Ta>Tb>Tc>Td. For example, Td may be 1 second, Tc may be 1 minute, Tb may be 1 hour, and Ta may be 1 month.

When Ts<Td, the computing device 11 may determine the second object as a dynamic information, such as a car or a pedestrian. When Td<Ts<Tc, the computing device 11 may determine the second object as a semi-dynamic information, such as a traffic accident, road constructions, or a traffic jam. Deduced from the aforementioned example, when Tc<Ts<Tb, the computing device 11 may determine the second object as a semi-static information. When Tb<Ts<Ta, the computing device 11 may determine the second object as a static information. According to the determination of Ts in comparison with Ta, Tb, Tc, and Td, the computing device 11 may provide a service function to classify the objects. The classification of the objects may be regarded as an assessment reference to the crossroad situation.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system for updating and sharing crossroad dynamic map data, comprising:
   an on-vehicle detecting device mounted on a host vehicle to detect at least one object around the host vehicle and periodically outputting a detection information including a host-vehicle absolute coordinate, a host-vehicle course, a host-vehicle speed, a relative speed between the at least one object and the host vehicle, and an initial relative coordinate between the at least one object and the host vehicle; and
   a computing device storing crossroad-section map data established in a geodesic coordinate system comprising a reference direction;
   wherein when the computing device receives the detection information from the on-vehicle detecting device, the computing device adds an estimated host-vehicle coordinate shift to the host-vehicle absolute coordinate to obtain a matched host-vehicle absolute coordinate, and adds an estimated object coordinate shift to the initial relative coordinate between the at least one object and the host vehicle to obtain a matched relative coordinate;

wherein the estimated host-vehicle coordinate shift is computed based on the host-vehicle speed and a time difference, and the estimated object coordinate shift is computed based on the relative speed between the at least one object and the host vehicle and the time difference;

wherein the estimated host-vehicle coordinate shift and the estimated object coordinate shift are respectively estimated to predict variations of the detection information within the time difference;

wherein the computing device converts the matched relative coordinate into a matched transformed coordinate by performing a coordinate rotation transformation according to the host-vehicle course and the reference direction, merges the matched host-vehicle absolute coordinate and the matched transformed coordinate into the crossroad-section map data to form crossroad dynamic map data, and then shares the crossroad dynamic map data.

2. The system for updating and sharing crossroad dynamic map data of claim 1, wherein
the estimated object coordinate shift is represented as:

$$\begin{bmatrix} X_{object\_shift} \\ Y_{object\_shift} \end{bmatrix} = \begin{bmatrix} V_{X\_relative} \\ V_{Y\_relative} \end{bmatrix} * \Delta T$$

wherein X and Y are coordinate axes in an X-Y plane coordinate system, $$\begin{bmatrix} X_{object\_shift} \\ Y_{object\_shift} \end{bmatrix}$$

is the estimated object coordinate shift;

$$\begin{bmatrix} V_{X\_relative} \\ V_{Y\_relative} \end{bmatrix}$$

is the relative speed between the at least one object and the host vehicle, and $\Delta T$ is the time difference;
the matched relative coordinate is represented as:

$$\begin{bmatrix} X_{object\_match} \\ Y_{object\_match} \end{bmatrix} = \begin{bmatrix} X_{object\_shift} \\ Y_{object\_shift} \end{bmatrix} + \begin{bmatrix} X_{relative} \\ Y_{relative} \end{bmatrix}$$

wherein $\begin{bmatrix} X_{object\_match} \\ Y_{object\_match} \end{bmatrix}$ is the matched relative coordinate, and $$\begin{bmatrix} X_{relative} \\ Y_{relative} \end{bmatrix}$$

is the initial relative coordinate;

the matched transformed coordinate is represented as:

$$\begin{bmatrix} X^n \\ Y^n \end{bmatrix} = \begin{bmatrix} \cos(\theta°) & \sin(\theta°) \\ -\sin(\theta°) & \cos(\theta°) \end{bmatrix} \begin{bmatrix} X_{object\_match} \\ Y_{object\_match} \end{bmatrix}$$

wherein $\begin{bmatrix} X^n \\ Y^n \end{bmatrix}$ is the matched transformed coordinate;

$$\begin{bmatrix} \cos(\theta°) & \sin(\theta°) \\ -\sin(\theta°) & \cos(\theta°) \end{bmatrix}$$

is a rotation matrix, and $\theta°$ is a rotation angle of the rotation matrix;
the estimated host-vehicle coordinate shift is represented as:

$$\begin{bmatrix} X_{local\_shift} \\ Y_{local\_shift} \end{bmatrix} = \begin{bmatrix} V_{X\_local} \\ V_{Y\_local} \end{bmatrix} * \Delta T$$

wherein X and Y are coordinate axes in the X-Y plane coordinate system, $$\begin{bmatrix} X_{local\_shift} \\ Y_{local\_shift} \end{bmatrix}$$

is the estimated host-vehicle coordinate shift, $$\begin{bmatrix} V_{X\_local} \\ V_{Y\_local} \end{bmatrix}$$

is the host-vehicle speed, and $\Delta T$ is the time difference;
the matched host-vehicle absolute coordinate is represented as:

$$\begin{bmatrix} X_{local\_match} \\ Y_{local\_match} \end{bmatrix} = \begin{bmatrix} X_{local\_shift} \\ Y_{local\_shift} \end{bmatrix} + \begin{bmatrix} X_{local} \\ Y_{local} \end{bmatrix}$$

wherein $\begin{bmatrix} X_{local\_match} \\ Y_{local\_match} \end{bmatrix}$ is the matched host-vehicle absolute coordinate of the host vehicle, and $$\begin{bmatrix} X_{local} \\ Y_{local} \end{bmatrix}$$

is the host-vehicle absolute coordinate of the host vehicle.

3. The system for updating and sharing crossroad dynamic map data of claim 1 further comprising an object detecting device, wherein
the at least one object detected by the on-vehicle detecting device is defined as at least one first object, and the object detecting device detects at least one second object;
the object detecting device is fixedly installed on a roadside to transmit an auxiliary detection information to the computing device, and the auxiliary detection information includes an absolute coordinate of the object detecting device, a relative speed between the at least one second object and the object detecting device, and a relative coordinate between the at least one second object and the object detecting device;

the computing device computes an auxiliary coordinate shift according to the relative speed between the at least one second object and the object detecting device and a time difference, adds the auxiliary coordinate shift to the relative coordinate between the at least one second object and the object detecting device to obtain an auxiliary matched coordinate, and directly adds the auxiliary matched coordinate to the absolute coordinate of the object detecting device to merge into the crossroad-section map data.

4. The system for updating and sharing crossroad dynamic map data of claim 1, wherein the computing device is an Edge computing device.

5. The system for updating and sharing crossroad dynamic map data of claim 2, wherein the computing device is an Edge computing device.

6. The system for updating and sharing crossroad dynamic map data of claim 3, wherein the computing device is an Edge computing device.

7. The system for updating and sharing crossroad dynamic map data of claim 1, wherein the computing device is a cloud server to provide service functions based on the detection information received from the on-vehicle detecting device.

8. The system for updating and sharing crossroad dynamic map data of claim 2, wherein the computing device is a cloud server to provide service functions based on the detection information received from the on-vehicle detecting device.

9. The system for updating and sharing crossroad dynamic map data of claim 3, wherein the computing device is a cloud server to provide service functions based on the detection information received from the on-vehicle detecting device.

10. A method for updating and sharing crossroad dynamic map data, performed by a computing device and comprising:
receiving a detection information outputted from at least one on-vehicle detecting device, wherein the detection information includes a host-vehicle absolute coordinate, a host-vehicle course, a host-vehicle speed, a relative speed between at least one object and a host vehicle, and an initial relative coordinate between the at least one object and the host vehicle;
adding an estimated host-vehicle coordinate shift to the host-vehicle absolute coordinate to obtain a matched host-vehicle absolute coordinate, and adding an estimated object coordinate shift to the initial relative coordinate between the at least one object and the host vehicle to obtain a matched relative coordinate; wherein the estimated host-vehicle coordinate shift is computed based on the host-vehicle speed and a time difference, and the estimated object coordinate shift is computed based on the relative speed between the at least one object and the host vehicle and the time difference; wherein the estimated host-vehicle coordinate shift and the estimated object coordinate shift are respectively estimated to predict variations of the detection information within the time difference;
converting the matched relative coordinate into a matched transformed coordinate by performing a coordinate rotation transformation according to the host-vehicle course and a reference direction of a geodesic coordinate system;
merging the matched host-vehicle absolute coordinate and the matched transformed coordinate into crossroad-section map data to form crossroad dynamic map data; and
sharing the crossroad dynamic map data.

11. The method for updating and sharing crossroad dynamic map data of claim 10, wherein
the estimated object coordinate shift is represented as:

$$\begin{bmatrix} X_{object\_shift} \\ Y_{object\_shift} \end{bmatrix} = \begin{bmatrix} V_{X\_relative} \\ V_{Y\_relative} \end{bmatrix} * \Delta T$$

wherein X and Y are coordinate axes in an X-Y plane coordinate system, $$\begin{bmatrix} X_{object\_shift} \\ Y_{object\_shift} \end{bmatrix}$$

is the estimated object coordinate shift;

$$\begin{bmatrix} V_{X\_relative} \\ V_{Y\_relative} \end{bmatrix}$$

is the relative speed between the at least one object and the host vehicle, and $\Delta T$ is the time difference;
the matched relative coordinate is represented as:

$$\begin{bmatrix} X_{object\_match} \\ Y_{object\_match} \end{bmatrix} = \begin{bmatrix} X_{object\_shift} \\ Y_{object\_shift} \end{bmatrix} + \begin{bmatrix} X_{relative} \\ Y_{relative} \end{bmatrix}$$

wherein $\begin{bmatrix} X_{object\_match} \\ Y_{object\_lmatch} \end{bmatrix}$ is the matched relative coordinate, and $$\begin{bmatrix} X_{relative} \\ Y_{relative} \end{bmatrix}$$

is the initial relative coordinate.

12. The method for updating and sharing crossroad dynamic map data of claim 11, wherein
the estimated host-vehicle coordinate shift is represented as:

$$\begin{bmatrix} X_{local\_shift} \\ Y_{local\_shift} \end{bmatrix} = \begin{bmatrix} V_{X\_local} \\ V_{Y\_local} \end{bmatrix} * \Delta T$$

wherein X and Y are coordinate axes in the X-Y plane coordinate system, $$\begin{bmatrix} X_{local\_shift} \\ Y_{local\_shift} \end{bmatrix}$$

is the estimated host-vehicle coordinate shift, $$\begin{bmatrix} V_{X\_local} \\ V_{Y\_local} \end{bmatrix}$$

is the host-vehicle speed, and ΔT is the time difference; the matched host-vehicle absolute coordinate is represented as:

$$\begin{bmatrix} X_{local\_match} \\ Y_{local\_match} \end{bmatrix} = \begin{bmatrix} X_{local\_shift} \\ Y_{local\_shift} \end{bmatrix} + \begin{bmatrix} X_{local} \\ Y_{local} \end{bmatrix}$$

wherein $\begin{bmatrix} X_{local\_match} \\ Y_{local\_match} \end{bmatrix}$ is the matched host-vehicle absolute coordinate of the host vehicle, and $$\begin{bmatrix} X_{local} \\ Y_{local} \end{bmatrix}$$

is the host-vehicle absolute coordinate of the host vehicle.

13. The method for updating and sharing crossroad dynamic map data of claim 12, wherein the matched transformed coordinate is represented as:

$$\begin{bmatrix} X^n \\ Y^n \end{bmatrix} = \begin{bmatrix} \cos(\theta^\circ) & \sin(\theta^\circ) \\ -\sin(\theta^\circ) & \cos(\theta^\circ) \end{bmatrix} \begin{bmatrix} X_{object\_match} \\ y_{object\_match} \end{bmatrix}$$

wherein $\begin{bmatrix} X^n \\ Y^n \end{bmatrix}$ is the matched transformed coordinate;

$$\begin{bmatrix} \cos(\theta^\circ) & \sin(\theta^\circ) \\ -\sin(\theta^\circ) & \cos(\theta^\circ) \end{bmatrix}$$

is a rotation matrix, and θ° is a rotation angle of the rotation matrix.

14. The method for updating and sharing crossroad dynamic map data of claim 10, wherein the at least one object detected by the on-vehicle detecting device is defined as at least one first object, and the method for updating and sharing crossroad dynamic map data further comprises:

receiving an auxiliary detection information from at least one object detecting device detecting at least one second object, wherein the auxiliary detection information includes an absolute coordinate of the at least one object detecting device, a relative speed between the at least one second object and the at least one object detecting device, and a relative coordinate between the at least one second object and the at least one object detecting device;

computing an auxiliary coordinate shift according to the relative speed between the at least one second object and the at least one object detecting device and a time difference;

adding the auxiliary coordinate shift to the relative coordinate between the at least one second object and the at least one object detecting device to obtain an auxiliary matched coordinate; and directly adding the auxiliary matched coordinate to the absolute coordinate of the at least one object detecting device to merge into the crossroad-section map data.

\* \* \* \* \*